Figure 1:
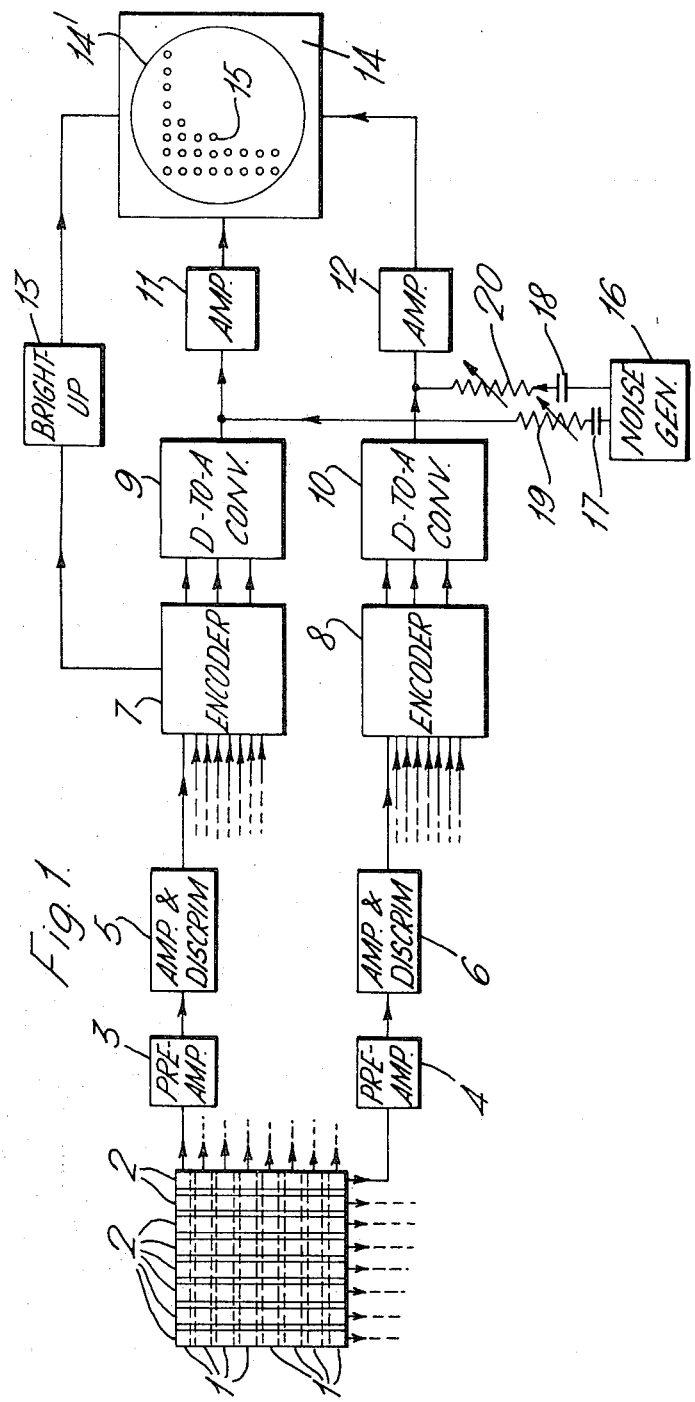

United States Patent [19]
Gore et al.

[11] 3,783,334
[45] Jan. 1, 1974

[54] CATHODE RAY TUBE DISPLAY SYSTEMS

[75] Inventors: William George Gore, Newbury; Roy Percival Parker, Leatherhead, both of England

[73] Assignee: National Research Development Corporation, London, England

[22] Filed: July 16, 1970

[21] Appl. No.: 55,495

[30] Foreign Application Priority Data
July 23, 1969    Great Britain.................. 37,138/69

[52] U.S. Cl. .................. 315/18, 250/71.5 S, 315/22, 315/30
[51] Int. Cl. ............................................. H01j 29/80
[58] Field of Search .................. 250/71.5 S; 315/18, 315/22

[56] References Cited
UNITED STATES PATENTS
2,942,109   6/1960   Bell et al. ...................... 250/71.5 S
3,405,233   10/1968  Anger ......................... 250/71.5 S X
3,440,480   4/1969   Henderson ............................ 315/18
3,519,876   7/1970   Murray ............................ 315/22 X
3,532,927   10/1970  Hindel ................................ 315/18

OTHER PUBLICATIONS
Bender et al., Nucleonics, Vol. 21, No. 10, Oct. 1963, pp. 52–55.
Anger, Nucleonics, Vol. 21, No. 10, Oct. 1963, pp. 56–59.

*Primary Examiner*—Leland A. Sebastian
*Attorney*—Cushman, Darby and Cushman

[57] ABSTRACT

A display system, having particular application in gamma cameras, in which items of information are represented by bright spots on the screen of a cathode ray tube. The display is basically in the form of a digital array of positions corresponding to different kinds of item, but is made easier to interpret by spreading out the spots for each position of the array.

7 Claims, 3 Drawing Figures

CATHODE RAY TUBE DISPLAY SYSTEMS

This invention relates to cathode ray tube display systems of the kind comprising a cathode ray tube having a luminescent screen, means for modulating the electron beam of the tube by means of a series of uniform brightening pulses which excite the screen to luminescence, and means for deflecting the electron beam by means of deflection pulses synchronous with the brightening pulses, the brightening pulses representing individual items of information of different kinds and the deflection pulses having amplitudes chosen so that the position at which the screen is excited by a brightening pulse depends upon the kind of item represented by that pulse.

Display systems of this kind may be used to provide a pictorial representation of the relative frequencies of occurrence of events of different kinds, one application of particular interest being the provision of two-dimensional displays for gamma cameras. In this application the brightening pulses correspond to the detection of gamma rays emitted from an area of interest, for example an area of a human body into which an appropriate radio-isotope has been introduced for the purpose of medical diagnosis; the deflection pulses have amplitudes selected so that gamma rays emitted from different sub-divisions of the area will result in bright spots on the screen of the cathode ray tube at different positions corresponding in layout to those of the sub-divisions. Those positions on the screen corresponding to the sub-divisions emitting the most rays will therefore be the most frequently illuminated, and if a photograph is taken of the screen using an exposure which is long relative to the count-rate, or if a storage tube is used, the relative concentration of radio-activity over the area will be represented by the variations in brightness over the photograph or screen. Such a representation is known as a grey-scale display.

For ease of data handling, e.g. by a computer, it is desirable that the locations of the sub-divisions should be characterised by digital numbers. If, in a display of the above kind, digital-valued deflection pulses are used to produce the illuminated screen positions, the result will be a pattern of superimposed spots. The resulting photographs will therefore show a pattern, e.g. a rectangular array, of light spots on a dark background, the brightness of each spot being a measure of the number of superimposed spots and hence, in the aforementioned cameras, of the activity of the corresponding subdivision. Such a pattern is difficult to interpret by the eye however, and in particular the ability to recognise relatively small differences in brightness between adjacent spots is limited.

It is an object of the present invention to provide a cathode ray tube display system of the kind specified which is improved in this respect.

According to the invention, the deflection pulses are in the form of digital-valued pulses modulated in amplitude, the digital values being selected according to the kinds of item represented by the brightening pulses and corresponding to an array of discrete positions on the screen, and the modulation being such that for each such position the excitation of the screen is distributed over an appreciable portion of the screen.

The modulation may for example suitably be made such that the excited portions of the screen corresponding to adjacent positions of the array abut each other or even overlap.

Preferably the rate-of-change of the modulation is made small relative to the duration of the pulses, so as to avoid unduly broadening the individual bright spots on the screen.

The modulation may be in the form of noise or may be a regularly recurrent signal with a sawtooth or other suitable waveform. Where substantially Gaussian noise modulation is used, the modulation may be adjustable so that the excited portions of the screen corresponding to adjacent positions of the array overlap with half peak noise amplitude corresponding to a point approximately midway between the adjacent positions. Where noise modulation is used, the above-mentioned rate-of-change condition can be achieved by limiting the high-frequency content of the noise.

The array of positions may be two-dimensional, forming for example a rectangular array, but the invention is also applicable to one-dimensional arrays, for example, a single line of positions.

Figure 2:
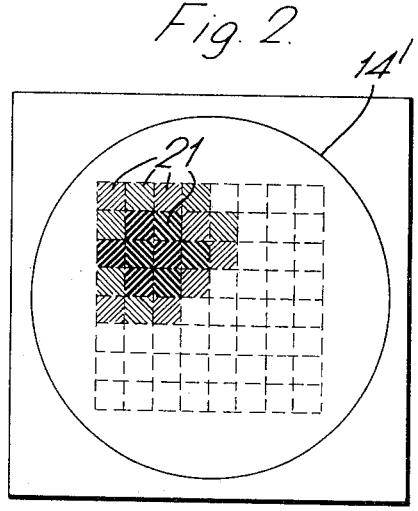
Figure 3:
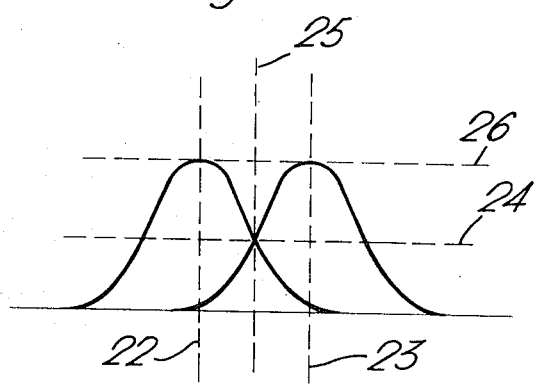

To enable the nature of the present invention to be more readily understood, attention is directed, by way of example, to the accompanying drawings wherein:

FIG. 1 is a block schematic diagram of the circuit of a gamma camera including a display system according to the present invention, FIG. 2 is an enlarged view of the form of grey-scale display obtainable with the arrangement of FIG. 1, FIG. 3 is a graph illustrating a preferred adjustment of modulating amplitude using Gaussian noise.

Referring to FIG. 1, the gamma camera includes a radiation detector of the kind disclosed in copending U.S. Pat. application No. 831,639, filed June 9, 1969, now U.S. Pat. No. 3,691,389, which comprises a rectangular slab of semiconductor material whose opposite faces are each provided with eight parallel ribs 1 and 2, the ribs on one face being arranged at right angles to those on the other face. Each intersection of these ribs forms a discrete gamma ray counter, and an output pulse is obtained from contacts secured to each of the two intersecting ribs when a gamma ray is incident at the intersection.

The contact on each horizontal rib 1 (as oriented in the drawing) is connected to a separate preamplifier 3 and on each vertical rib 2 to a separate preamplifier 4. Each preamplifier 3 or 4 is followed by a main amplifier and pulse amplitude discriminator 5 or 6 respectively which delivers an output pulse if the input pulse is above a predetermined amplitude.

The outputs from the eight discriminators 5 are fed to a common binary encoder 7, and from the eight discriminators 6 to a common binary encoder 8. Each encoder operates in a manner familiar to those skilled in the art and comprises a plurality of NOR gates to which the discriminator outputs are connected, the encoder having three output terminals and the presence of appropriate outputs thereat representing the digits 0 – 7. Thus the binary number represented by the output of the encoder 7 is characteristic of the rib 1 at whose intersection a gamma ray was incident and similarly the binary number represented by the output of encoder 8 is characteristic of the rib 2 at whose intersection a gamma ray was incident, so that the coincident outputs from the two encoders 7 and 8 characterise the particular intersection.

The outputs from encoders 7 and 8 are fed to conventional digital-to-analogue converters 9 and 10 respectively, which generate digital-valued output pulses, of duration one microsecond, whose amplitude is proportional to the input binary number. These pulses are amplified by amplifiers 11 and 12 and applied to the X and Y deflection plates respectively of a cathode ray tube 14 having a luminescent screen 14'. The electron gun of the tube 14 is biassed so that the electron beam is normally cut off, and the screen 14' is arranged to be excited to luminescence by applying to the electron gun, via circuit 13, uniform brightening pulses generated by the encoder 7 synchronously with the digital-valued pulses; each brightening pulse thus corresponds to the incidence of a gamma ray on one of the intersections between the ribs 1 and 2 and for each such pulse there is produced on the screen 14' a bright spot at a position corresponding to the intersection where the gamma ray was incident. The sort of pattern obtained from a plurality of gamma rays incident on the detector, in the absence of modulation, is thus as shown at 15, viz a rectangular array of superimposed spots. When the screen 14' is photographed with a relatively long exposure, the brightness of the spots on the photograph depends on the number of superimposed spots occurring at each position during the exposure. The usual adjustable DC shift voltages for adjusting the position of the display on the screen 14' are omitted for clarity.

Such a form of display is difficult to interpret, as already discussed. In accordance with the present invention the digital-valued pulses are modulated in amplitude to produce deflection pulses for application to the tube 14 by applying to the inputs of amplifiers 11 and 12, in addition to the outputs from converters 9 and 10, noise signals derived from a noise generator 16 via capacitors 17 and 18 respectively. The amplitudes of the applied noise signals are adjustable by means of variable resistors 19 and 20.

The effect obtainable is illustrated in FIG. 2. Provided the noise signal amplitudes are suitably adjusted, the spots 15 of FIG. 1 can be expanded to form the abutting squares 21 of FIG. 2. Increased ease of interpretation is obtained even if the squares are not made to abut, but it is preferred that they should do so. Eight adjoining squares in FIG. 2 are shown shaded more heavily for clarity to represent the position of a radioactive concentration in the body, although in practice the resulting photograph would show them brighter than the remainder.

It is possible, instead of using noise, to modulate the digital-valued pulses with a fast sawtooth, but this gives the squares sharply defined edges and makes abutting difficult. By contrast, when using Gaussian noise it can be arranged that the half-amplitude value of the noise curve corresponds to a point located approximately half-way between the unmodulated positions. Adjacent areas therefore overlap in such a way as to add up to a constant density of spots for an equal number of spots per position. This effect is illustrated in FIG. 3 where the lines 22 and 23 represent adjacent unmodulated positions and the Gaussian curves (which show the probability of the amplitude of the noise at any instant plotted against its amplitude about a D.C. level) cross at the half-amplitude level 24 located on the line 25 midway between lines 22 and 23. The constant sum is represented by line 26.

A further advantage of using Gaussian noise in the gamma camera application, rather than a repetitive waveform, is that the distribution of illumination over each illuminated area thereby matches approximately the response of the detector. This is because the detector is used with a collimator (not shown) having rectangular channels which register with the rib intersections. Since the gamma rays may approach the collimator at various angles of incidence, not necessarily parallel to the channel axes, it follows that the detector receives more gamma rays from points on the body lying on the axes of the channels than on their peripheries, rays from the latter tending to be absorbed in the channel walls to a greater degree.

The noise generator 16 incorporates two noise sources which respectively produce the noise signals fed to the amplifiers 11 and 12; each noise source utilises the noise current of a Zener diode, e.g. of type CV 7142, and comprises a transistor amplifier in which the noise is amplified and whose upper cut-off frequency is reduced by conventional feedback means to about 90 kHz so that no appreciable broadening of the spots, as opposed to modulation of their positions, is produced. If the noise voltage changes appreciably during a deflection pulse, i.e., if its high-frequency content is too great relative to the pulse duration, the tendency is to broaden superimposed spots instead of distributing nonbroadened spots over the area with a Gaussian probability. The preferred effect may be compared with the reproduction of pictures in newspapers, where shading is effected by varying the spacing of uniform black dots.

For each noise source the noise output is rectified and compared with a predetermined voltage in a difference amplifier, the output of the latter being connected to control the D.C. current through the Zener diode and thereby maintain a constant noise output level from the source.

The brightness of the spot produced by each brightening pulse is preferably made less than will cause a single spot to saturate the film being used to photograph the screen. It may be arranged, for example, that, say, five superimposed spots are required to produce saturation. This allows superimposed spots to increase the brightness of the resulting photograph, thus enabling more information on distribution between areas to be obtained from the photograph.

Normally the exposure time used is so long relative to the count-rate that the individual spots are not discernible in the resulting photograph, but it is not essential to operate the invention in this way.

For a rectangular array of positions as shown, the modulation in the X and Y directions will normally be of equal amplitude to produce square illuminated areas, but for other applications this may not be the case.

Although described particularly with reference to its use in a gamma camera, a display system according to the invention is applicable to the display of digital information from other sources, usually but not essentially resulting from events occurring randomly in time.

We claim:
1. A cathode ray tube display system wherein said cathode ray tube includes a luminescent screen which may be excited to luminescence by an electron beam generated within the tube comprising means for modulating said electron beam by means of a series of uniform brightening pulses which excite said screen to lu- minescence, said brightening pulses representing individual items of information of different kinds; and means for deflecting said electron beam by means of deflection pulses synchronous with said brightening pulses, said deflecting means comprising means for generating digital-valued pulses having values selected according to the kinds of item represented by said brightening pulses and corresponding to an array of discrete positions on said screen, and means for deriving said deflection pulses by relatively low frequency amplitude modulation of said digital-valued pulses so that for each position of said array the excitation of said screen is distributed over an appreciable portion of the screen.

2. A display system according to claim 1, in which said amplitude modulation comprises Gaussian noise.

3. A display system according to claim 2, in which said amplitude modulation is adjustable so that the excited portions of said screen corresponding to adjacent positions of said array overlap with half peak noise amplitude corresponding to a point approximately midway between the adjacent positions.

4. A display system according to claim 1, in which the rate-of-change of said amplitude modulation is small relative to the duration of said pulses.

5. A display system according to claim 1, in which said means for generating digital-valued pulses is operative to generate a pair of digital-valued pulses corresponding to each brightening pulse, and said means for deriving said deflection pulses is operative to derive from each pair of digital-valued pulses a pair of deflection pulses which respectively deflect said electron beam in orthogonal directions, whereby said array of positions is two-dimensional.

6. A gamma camera comprising a display system according to claim 5, a two-dimensional array of gamma ray counters, and means for generating one of said brightening pulses in response to the incidence of a gamma ray on any one of said counters, said means for generating digital-valued pulses being operative so that the values of the pair of digital-valued pulses corresponding to said one of said brightening pulses characterise the position of said one of said counters in said array of counters.

7. A display system according to claim 1 in which said amplitude modulation comprises a saw-tooth wave form.

* * * * *